United States Patent [19]
Krizman

[11] 3,969,895
[45] July 20, 1976

[54] POWER CONTROL VALVE ATTACHMENT FOR TWO CYCLE MOTORCYCLE TYPE ENGINE EXHAUST SYSTEMS

[76] Inventor: John Krizman, 13935 Nordhoff, Arleta, Calif. 91331

[22] Filed: June 24, 1974

[21] Appl. No.: 482,010

[52] U.S. Cl. ............................... 60/312; 60/324; 123/65 EM; 181/65
[51] Int. Cl.² .......................................... F02B 27/02
[58] Field of Search .................... 123/65 E, 65 EM; 60/292, 312, 314, 324; 181/47 R, 47 A, 47 B, 65

[56] References Cited
UNITED STATES PATENTS

| | | | |
|---|---|---|---|
| 1,163,128 | 12/1915 | Brauer | 181/65 |
| 2,044,839 | 6/1936 | Duffy | 181/65 |
| 2,542,756 | 2/1951 | Draminsky | 123/65 E |
| 3,346,071 | 10/1967 | Lader | 181/65 |
| 3,726,092 | 4/1973 | Raczuk | 123/65 E |
| 3,786,791 | 1/1974 | Richardson | 60/314 |
| 3,817,227 | 6/1974 | Onishi | 123/103 |

FOREIGN PATENTS OR APPLICATIONS

| | | | |
|---|---|---|---|
| 714,192 | 11/1931 | France | 181/65 |
| 237,683 | 9/1945 | Switzerland | 123/65 |

*Primary Examiner*—Wendell E. Burns
*Assistant Examiner*—David D. Reynolds
*Attorney, Agent, or Firm*—Poms, Smith, Lande & Glenny

[57] ABSTRACT

A power control valve attachment is provided for assembly to a pre-existing exhaust system of a two cycle motorcycle type engine for effecting a back pressuring of the engine cylinder chambers during operation of the engine and includes an assembly of pressure plate and spring biasing means and means for mounting the assembly in the exhaust system duct at a minimum cross sectional area thereof for axial deflective movement under the pressure of the exhaust gases.

2 Claims, 5 Drawing Figures

POWER CONTROL VALVE ATTACHMENT FOR TWO CYCLE MOTORCYCLE TYPE ENGINE EXHAUST SYSTEMS

BACKGROUND OF THE INVENTION

This invention relates in general to a means for varying the back pressure in an exhaust system for internal combustion engines and more particularly, to a power control valve attachment for assembly to a back pressuring exhaust system of a two cycle motorcycle type engine for producing a variable back pressuring of the engine under varying operating conditions thereof.

Back pressuring exhaust control valves have been employed heretofore with two cycle type engines as in the McKechnie U.S. Pat. No. 1,318,781 and Junkers U.S. Pat. No. 1,320,062. In the McKechnie patent, a spring biased flap valve was employed as close to the cylinder exhaust port as possible for throttling exhaust gases just prior to closure of the port by the cylinder. In Junkers, a biased, or otherwise controlled valve was employed for restricting gas flow from an exhaust chamber in an effort to produce a substantially constant back pressure on the engine cylinder. Neither of these valve constructions were suitable for use as an attachment to a pre-existing exhaust system of the type currently in use.

Currently, it is common practice to utilize specially designed back pressuring exhaust systems for the two cycle type engines in use on motorcycle engines. In such two cycle engines, the fuel and air charge is introduced through a port in the cylinder side wall at the same time that exhaust gases are being forced out of the cylinder through another port in the side wall of the cylinder under influence of the return stroke of the cylinder. Specially developed exhaust systems have been designed heretofore to provide just the right back pressure upon the exhaust gases during their evacuation to allow for the exhaust of exhaust gases, yet prevent the exhausting of the charging fuel and air mixture being introduced preparatory to a ignition and power stroke. However, the back pressure characteristics of the exhaust system must be carefully determined for the expected operating conditions of the vehicle, as for example, hill climbing versus street riding.

It has been common heretofore to provide a duct section in exhaust system, commonly referred to as a "stinger" with a minimum cross sectional diameter for the system to provide the desired back pressure of the system. In some exhaust systems, the stinger is replaceable, while in others a removable orifice disc may be inserted into the stinger to provide a desired back pressure for an expected engine operating condition. However, once the particular "stinger" or orifice disc has been assembled to the exhaust gas system, the back pressure characteristics of the system are set for operation of the vehicle.

Another prior art approach with the aforementioned type of exhaust systems is to build in a valve in the pressure chamber which presumably provides a pressure wave reflecting surface to reflect a positive pressure wave in the exhaust system, as in U.S. Pat. NO. 3,703,937. However, this approach does not lend itself to the type of attachment or assembly for pre-existing exhaust systems as contemplated in the present invention, nor is its construction or mode of operation similar to that of the present invention.

It is the primary object of the present invention to disclose and provide a power control valve attachment or assembly which may be conveniently assembled to pre-existing exhaust systems of the type hereinbefore discussed for providing a controlled back pressuring by the system during operation of the vehicle in response to engine operating characteristics to increase the power output thereof.

It is another object of the within invention to disclose and provide a power control valve attachment, as in the foregoing object, wherein the control valve means may be easily incorporated into a duct section of the pre-existing engine exhaust system to utilize the duct section as part of the valve means in a relatively inexpensive, easily assembled and maintained manner for improving the power output characteristics of the engine employed with the system.

SUMMARY OF THE INVENTION

Generally stated, the power control valve attachment according to the present invention, for controlling the power output of a two cycle motorcycle type engine having a back pressure producing exhaust system including a duct section of predetermined minimum diameter for producing a given normal back pressuring of the system, comprises the provision of an easily attached assembly of a duct closure means, for normally closing the duct, mounting means for mounting the closure means to the duct for movement between duct closed and duct open positions and biasing means for biasing the closure means toward its duct closing position under influence of the flow of exhaust gases through the duct.

More specifically, the power control valve means of the present invention includes the provision of an assembly of pressure plate means for sensing the pressure of exhaust gases flowing through the duct means and a spring biasing means which may be easily attached to a pre-existing exhaust system. The pressure plate means including both a imperforate plate portion and a perforate portion which is mounted in the path of flow of the exhaust gases to cause portions of the exhaust gases to impinge upon the plate portion and other portions of exhaust gases to flow through the perforated portion, the combined effect thereof causing a deflective movement of the plate means under pressure of the exhaust gases. A spring like biasing means is provided in the assembly for biasing the plate means against the aforementioned deflective movement to thereby provide a controlled back pressuring effect upon the engine cylinder chambers. More particularly, the pressure plate means comprises a tubular member having an open end, an opposite closed end and a side wall including a plurality of perforations or ports with the tubular member preferably being mounted coaxially within the exhaust system duct by having its closed end secured to and closed by the aforementioned imperforate plate portion of the plate means. The outside diameter of this perforated or ported tubular member is preferably smaller than the inside diameter of the surrounding duct section so that on assembly into the duct, portions of the exhaust gases flow into the tubular member and outwardly of the system through the member ports while other portions of the exhaust gases flow between the tubular member and surrounding duct section in exhausting from the duct. The biasing means may specifically comprise a tension spring connected between the plate means and a support member spanning the duct.

A more complete understanding of the invention in power control valve means for two cycle motorcycle type engines, as well as a greater appreciation for the advantages and objects thereof, will be afforded to those skilled in the art by a review of the following detailed description of a preferred exemplary embodiment thereof. Reference will be made to the appended sheets of drawings which will first be briefly described.

DESCRIPTION OF THE PREFERRED EXEMPLARY EMBODIMENT

Figure 1:
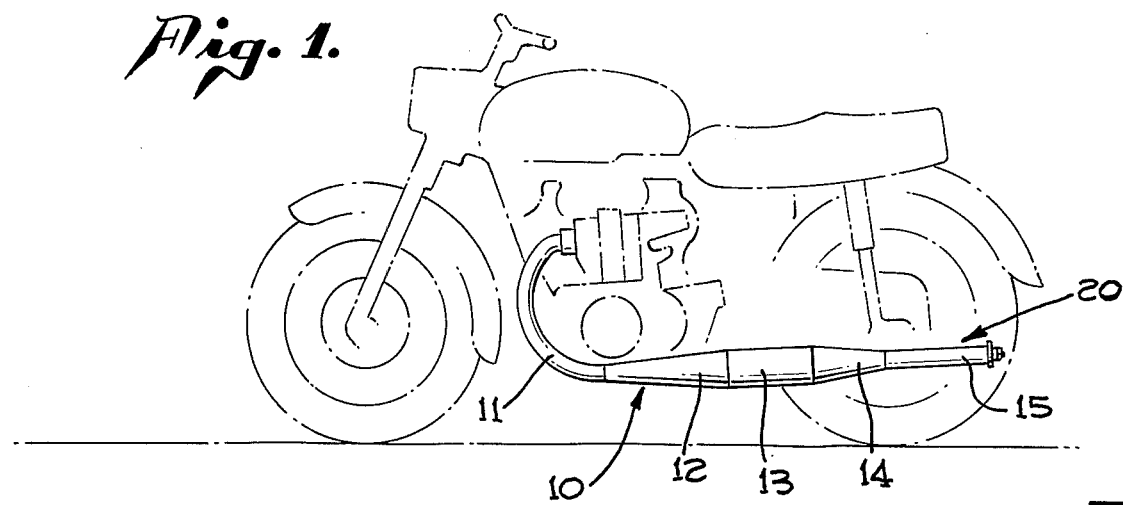
FIG. 1 is a side elevational view of a typical exhaust system for a two cycle motorcycle type engine having an exemplary embodiment of the power control valve means of the present invention incorporated therewith.

A preferred exemplary embodiment of the power control means for increasing the power output characteristics of a two cycle, motorcycle type engine, according to the present invention, will now be explained in detail. Referring first to FIG. 1, a typical motorcycle having a two cycle engine (both shown in phantom line) is shown with an otherwise conventional exhaust system indicated generally at 10. The exemplary exhaust system includes a head pipe 11 connected to the exhaust gas manifold of the engine and leading into an exhaust system chamber comprising front cone 12, midsection 13 and rear cone 14 as is known in the art. Further, as is typical with this type of engine exhaust system, there is a reduced diameter duct section 15 commonly known as "stinger". The "stinger" or duct section 15 is generally provided with a predetermined minimum cross sectional area for the exhaust system to provide for a given back pressuring affect by the system upon the engine cylinder chambers during operation.

As is particularly contemplated within the present invention, a power control valve means, according to the present invention, is mounted to and incorporated into the exhaust system at the duct section having the predetermined minimum diameter which, in the exemplary embodiment, comprises duct section or stinger 15. The exemplary power control means is indicated generally at 20, a portion thereof being seen protruding from the free open end of duct section 15 in FIG. 1.

Figure 2:
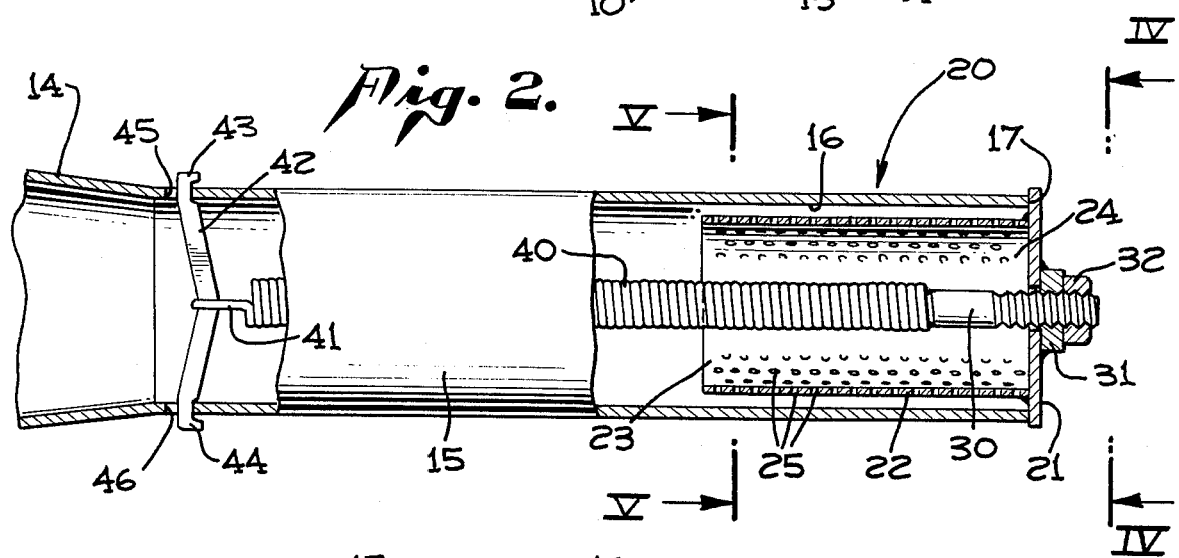
FIG. 2 is a vertical section view of the exemplary power control valve means of FIG. 1.
Figure 3:
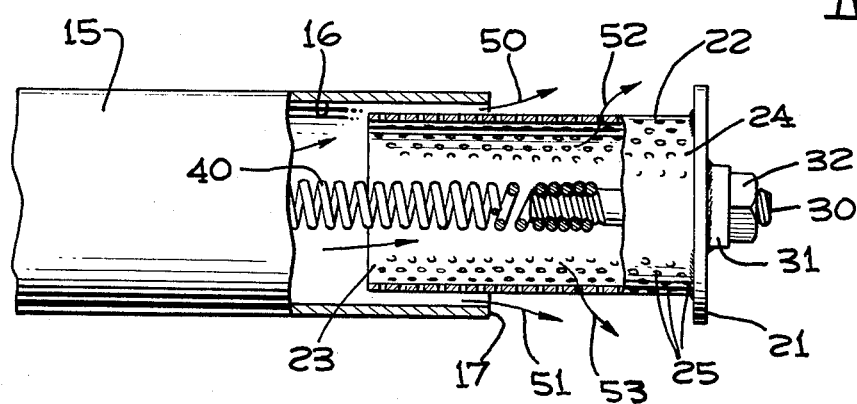
FIG. 3 is a detail view of the power control valve means of FIG. 2 showing portions of the control valve means in extended relation to a duct of the exhaust system under influence of discharging exhaust gases.
Figure 4:
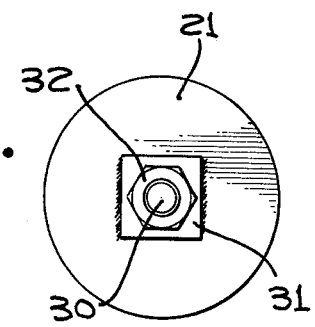
FIG. 4 is a right end view of the power control valve means of FIG. 2 taken therein along the plane IV—IV.
Figure 5:
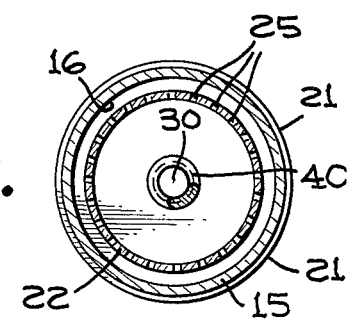
FIG. 5 is a cross section view of the power control valve means of FIG. 2 taken therein along the plane V—V.

Referring now to FIGS. 2 through 5, the exemplary embodiment of power control valve means, indicated generally at 20, is shown mounted to the stinger or duct section 15, the valve means being in a closed condition in the showing of FIG. 2 and an open condition in the showing of FIG. 3. The inner wall 16 of the tubular duct section 15 comprises the valve means throat section with the free end 17 of the duct providing a valve seat. A duct closure means, including the pressure plate 21 is provided for closing the duct, as seen in FIG. 2, subject to a variable opening thereof as hereinafter explained.

In order to sense the pressure of exhaust gases flowing down and out of the exhaust system through duct 15, and apply a suitable varying back pressure thereon, pressure sensing means are provided which include the provision of a perforated side wall tubular metering tube 22 secured to the pressure plate 21 as seen in FIGS. 2 and 3. Tube 22 may be made of a metallic screen-like material, formed into tubular configuration and welded or otherwise fastened to the plate 21. Metering tube 22 preferably includes an open end 23, facing into the flow of exhaust gases, a closed opposite end 24 (closed by plate 21) and a plurality of ports 25 through which exhaust gases entrained within tube 22 may escape in a pressure sensing or metering fashion.

Mounting means are provided for mounting the assembly of tubular member 22 and plate 21 to the duct in a position for axially aligning tubular member 22 within duct 15 with its inner end 23 facing the flow of exhaust gases and with plate 21 movable between a duct closure position of FIG. 2 and open position of FIG. 3. In the exemplary embodiment, such means comprise the provision of a mounting rod 30 which is threaded through a nut 31 welded or otherwise secured to the outer surface of plate 21. A lock nut 32 is provided for allowing adjustment of the relation between the mounting rod 30 and assembly of plate 21 and tubular member 22. The inner end of rod 30 is secured, as by welding or other suitable fastening means, to a biasing means comprising a tension spring 40. The rearward end of tension spring 40 is provided with a hook portion 41 which may be placed about a spring retainer 42, the latter having laterally projecting hook ends 43 and 44 engaging in opposed orifices 45 and 46 provided in duct sections 15. The mounting means for the assembly plate 21 and tubular member 22 may also comprise radial fins or flanges provided upon the exterior of tubular member 22 to ride within the interior wall 16 of the duct section. However, it has been found that the within combined mounting and biasing means construction as shown in FIGS. 2 and 3 provides for adequate mounting of the control valve since it is held in closed condition against the free end 17 of duct section 15 when the engine is not operating, as seen in FIG. 2, and tends to center itself during engine operation due to the flow of exhaust gases thereabout, as explained more fully hereinafter, and as seen in FIG. 3.

The outside diameter of tubular member 22 is preferably smaller than the inside diameter of inner wall 16 of duct section 15 by at least one eighth of an inch or more. In order to provide for flow of exhaust gases about the exterior of tubular member 22, as represented by arrows 50 and 51 in FIG. 3, in addition to the flow of exhaust gases through the ports of tubular member 22, as represented by arrows 52 and 53. It has been found that for smaller engines having a cubic inch displacement on the order of 100 – 200cc that a "stinger" ID of 1 1/16 inch is typical. In that case, the OD of the tubular member 22 is preferably on the order of fifteen sixteenths of an inch, providing a differential of ⅛ inch. For larger size engines, on the order of 250 – 500cc, a stinger ID size of 1 21/32 inch is typical. For this size stinger, the OD for the tubular member 22 is preferably on the order of 1 ½ inch, providing a differential in the respective diameters of approximately five thirty seconds of an inch. Further, in each example, a spring tension rate of 8 pounds per inch may be employed for the spring means 40.

As can be seen from the foregoing, when no exhaust gases are flowing through the exhaust system, indicated generally at 10, the power control valve means, indicated generally at 20, will assume the position of FIG. 2 wherein the duct closure means, including pressure plate 21, will be seated upon the end 17 of duct 15 closing the duct. On starting of the vehicle engine, an initial, relatively low, idling pressure will be created in the exhaust system which will cause opening of the control valve by a slight movement of plate 21 to the right of its position shown in FIG. 2. That is, the total pressure within the exhaust system will initially force an opening of the valve with the velocity pressure of the exhaust gases escaping through the duct 15 maintaining it open. Further, as particularly contemplated within the present invention, the flow of exhaust gases is directed into the open end 23 of the perforated tube 22 to impinge upon the closed end provided by the inner surface of plate 21. In this manner, pressure plate 21 continues to sense the velocity pressure of the exhaust gases, even in open condition, as seen in FIG. 3.

On running of the motorcycle engine at above an idling speed, the pressure within the exhaust system, indicated generally at 10, will increase. Accordingly, the flow of exhaust gases through duct section 15, both around tubular member 22, and through its ports 25, will increase and the pressure applied thereby upon the assembly of plate 21 and tubular member 22 will increase. On such increased exhaust gas pressure, the pressure sensing plate assembly, plate 21 and tubular member 22, will move to the right against the urging of spring means 40, the combined effect thereof causing an increased back pressuring of the exhaust gases within the exhaust system 10, generally equal to the force required to extend the associated spring means. Such increased back pressuring on the system is in direct proportion to the increase in flow rate of exhaust gases, and pressure thereof, as occurs under heavier loading of the motorcycle engine such as operating at high speed or in hill climbing as opposed to idling or low speed traveling.

It has been found that with the power control valve means, according to the present invention, incorporated into the "stinger" or duct section 15 of a two cycle motorcycle type engine as aforedescribed, that an increased power characteristic for the engine under varying operating conditions has been experienced. Further, although the present embodiment of power control valve means is illustrated in association with the "stinger" section of the exhaust system, it should be understood that the control valve means is preferably located at the duct section of the exhaust system which comprises the minimum cross sectional area for the system, which may occur at the stinger, as in the exemplary embodiment, or at an associated muffler or spark arrestor device as is normally employed with exhaust gas systems of the type discussed herein.

Having thus described a preferred exemplary embodiment of the power control valve means, according to the present invention, it is believed that those skilled in the art should appreciate that the within invention attains the advantages and objects aforestated therefor. Further, it should be appreciated by those skilled in the art that the within disclosure of power control valve means is exemplary only, and that various modifications, adaptations and alternative embodiments thereof may be made within the scope and spirit of the within invention which is defined by the following claims.

I claim:

1. A power control valve attachment for assembly to a pre-existing exhaust system of a two cycle type engine for increasing the power output characteristics thereof, said exhaust system having a back pressuring chamber including an outlet duct section of a given predetermined minimum internal cross sectional area of the exhaust system duct section for effecting a given back pressuring of the engine cylinder chambers during operation of the engine, said attachment comprising:

an assembly of pressure plate means for sensing the pressure of exhaust gases flowing out said duct section and biasing means for biasing said pressure plate means against deflective movement under pressure of said exhaust gases, said pressure plate means including a tubular member having an open end, a side wall including a plurality of ports and a closed end closed by a plate having an outer diameter larger than the internal diameter of said outlet duct section;

means for mounting said assembly in a slip fit relationship to said outlet duct section with said tubular member extending into the open end of said outlet duct section, with said biasing means extending into said duct section and with said plate being exteriorly and biased toward said open end of said duct section; and means for retaining said attachment in assembled relation to said duct, whereby said pressure plate means tubular member and plate are movable under the pressure of exhaust gases from a duct section closure position wherein said plate abuts and closes the open end of said duct section to variable back pressuring positions wherein portions of said tubular member protrude from said duct section open end and said plate is axially spaced therefrom.

2. The power control valve attachment of claim 1 wherein:

the outer diameter of said tubular member is smaller than the inner diameter of said outlet duct section by about one-eighth inch or more to provide for gas flow about said tubular member as well as through its ports, whereby said tubular member is centered in said outlet duct section during movement to said variable back pressuring positions by the forces exerted thereon due to the flow of gases thereby.

* * * * *